United States Patent
Adomaitis et al.

(10) Patent No.: US 9,889,992 B1
(45) Date of Patent: Feb. 13, 2018

(54) CONVEYOR BELT SLAT

(71) Applicant: PRINCE CASTLE LLC, Carol Stream, IL (US)

(72) Inventors: Matthew Adomaitis, Aurora, IL (US); Frank Anthony Agnello, Huntley, IL (US); Richard Bauer, Palatine, IL (US); Eloy Cerda, Westchester, IL (US); Mark Edward Fastabend, Chicago, IL (US); Sean Patrick Forrest, Park Ridge, IL (US); Charles B. Hartfelder, Hanover Park, IL (US); Karl Ronald Heinze, Chicago, IL (US); Scott R. Hammac, Joliet, IL (US); Kyle Thomas Kestner, Schaumburg, IL (US); Christine S. Laub, Roselle, IL (US); Eugene Stanley Maslana, Morton Grove, IL (US); Calvin States Nelson, Round Lake Beach, IL (US); Laurence A. Schoell, Shorewood, IL (US); Zoran Ulicevic, Wheaton, IL (US); Aleksandr Yazvin, Glenview, IL (US); Loren J. Veltrop, Chicago, IL (US); Brian J. Truesdale, Carol Stream, IL (US); Dennis Malkowski, Yorkville, IL (US)

(73) Assignee: PRINCE CASTLE LLC, Carol Stream, IL (US)

( * ) Notice: Subject to any disclaimer, the term of this patent is extended or adjusted under 35 U.S.C. 154(b) by 0 days.

(21) Appl. No.: 15/154,939

(22) Filed: May 13, 2016

Related U.S. Application Data

(60) Provisional application No. 62/161,239, filed on May 13, 2015.

(51) Int. Cl.
*B65G 17/08* (2006.01)
*B65G 17/34* (2006.01)

(52) U.S. Cl.
CPC .......... *B65G 17/083* (2013.01); *B65G 17/34* (2013.01); *B65G 2201/0202* (2013.01)

(58) Field of Classification Search
CPC ........ B65G 17/08; B65G 17/34; B65G 17/40; B65G 2201/0202; B65G 2207/30; A21B 1/48; A47J 37/045
(Continued)

(56) References Cited

U.S. PATENT DOCUMENTS 2,987,167 A * 6/1961 Franz ................. B65G 17/06
198/853
5,307,923 A * 5/1994 Damkjaer ............ B65G 17/086
198/852

(Continued)

FOREIGN PATENT DOCUMENTS

JP   H06-141985 A   5/1994

*Primary Examiner* — Gerald McClain
*Assistant Examiner* — Keith R Campbell
(74) *Attorney, Agent, or Firm* — Marshall, Gerstein & Borun LLP

(57) ABSTRACT

A conveyor belt includes a plurality of spaced rods and a plurality of slats. Each of the plurality of slats includes a base portion for carrying an item. The base portion has a perpendicular leading edge of the base portion relative to a direction of conveyance travel of the conveyor belt and a perpendicular trailing edge of the base portion relative to the direction of conveyance travel of the conveyor belt. At least one of the leading edge and the trailing edge is coupled to one of the plurality of rods.

6 Claims, 7 Drawing Sheets

(58) Field of Classification Search
USPC .......................................................... 198/853
See application file for complete search history.

(56) References Cited

U.S. PATENT DOCUMENTS

| | | | | |
|---|---|---|---|---|
| 6,223,889 B1 * | 5/2001 | Layne | ................ | B65G 17/086 |
| | | | | 198/853 |
| 6,581,758 B1 * | 6/2003 | van-Zijderveld | .... | B65G 17/086 |
| | | | | 198/850 |
| 6,918,486 B2 * | 7/2005 | Shibayama | .......... | B65G 17/086 |
| | | | | 198/850 |
| 7,419,051 B2 * | 9/2008 | Damkjær | ............. | B65G 17/086 |
| | | | | 198/850 |
| 7,530,455 B2 * | 5/2009 | Lucchi | ................... | B65G 17/08 |
| | | | | 198/853 |
| 7,708,135 B2 | 5/2010 | Ellerth et al. | | |
| 7,721,877 B2 | 5/2010 | Maine, Jr. et al. | | |
| 7,800,023 B2 | 9/2010 | Burtea et al. | | |
| 7,975,840 B2 | 7/2011 | Messick, Jr. et al. | | |
| 7,987,972 B2 | 8/2011 | Hennigar et al. | | |
| 8,499,928 B1 * | 8/2013 | Liao | ....................... | B65G 17/08 |
| | | | | 198/853 |
| 8,506,687 B2 | 8/2013 | Jones | | |
| 8,752,698 B2 * | 6/2014 | Lasecki | ................ | B65G 17/064 |
| | | | | 198/851 |
| 8,863,944 B2 * | 10/2014 | MacLachlan | .......... | B65G 17/08 |
| | | | | 198/851 |
| 9,221,611 B2 | 12/2015 | Ulchak et al. | | |
| 2010/0275789 A1 | 11/2010 | Lee et al. | | |
| 2015/0129395 A1 | 5/2015 | Messick, Jr. | | |
| 2015/0151919 A1 | 6/2015 | Messick, Jr. et al. | | |
| 2015/0191312 A1 | 7/2015 | Ulchak et al. | | |
| 2016/0185529 A1 | 6/2016 | Bauer | | |
| 2016/0185530 A1 | 6/2016 | Malkowski et al. | | |

* cited by examiner

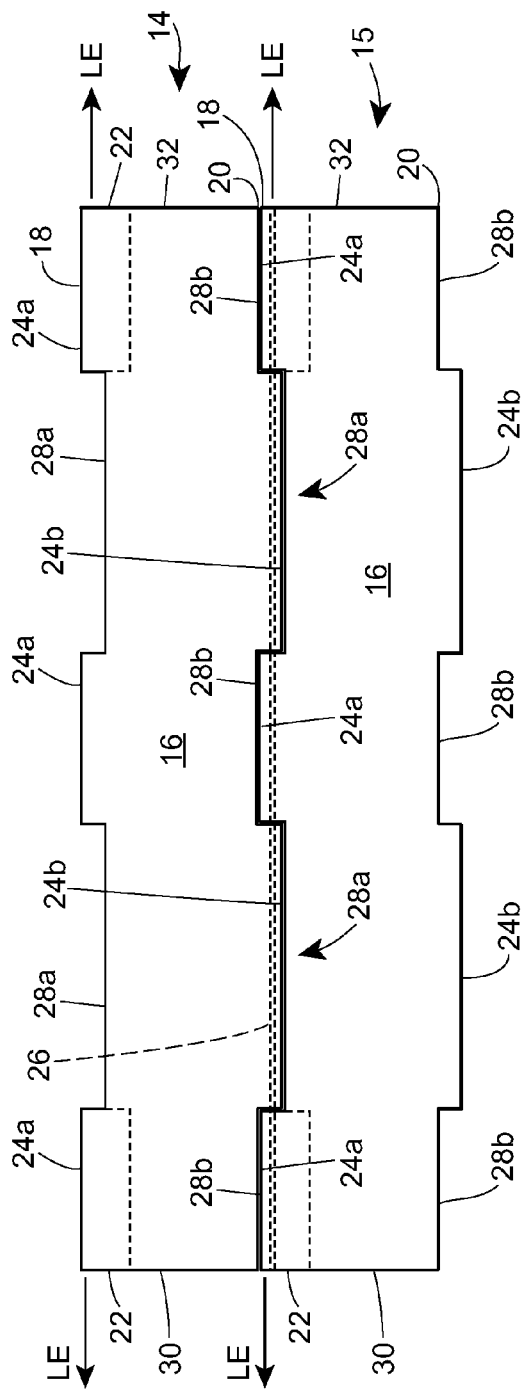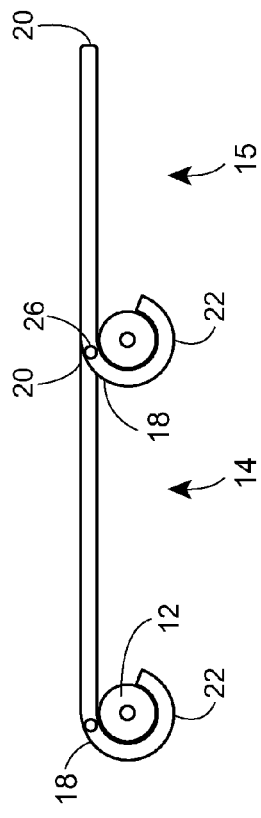

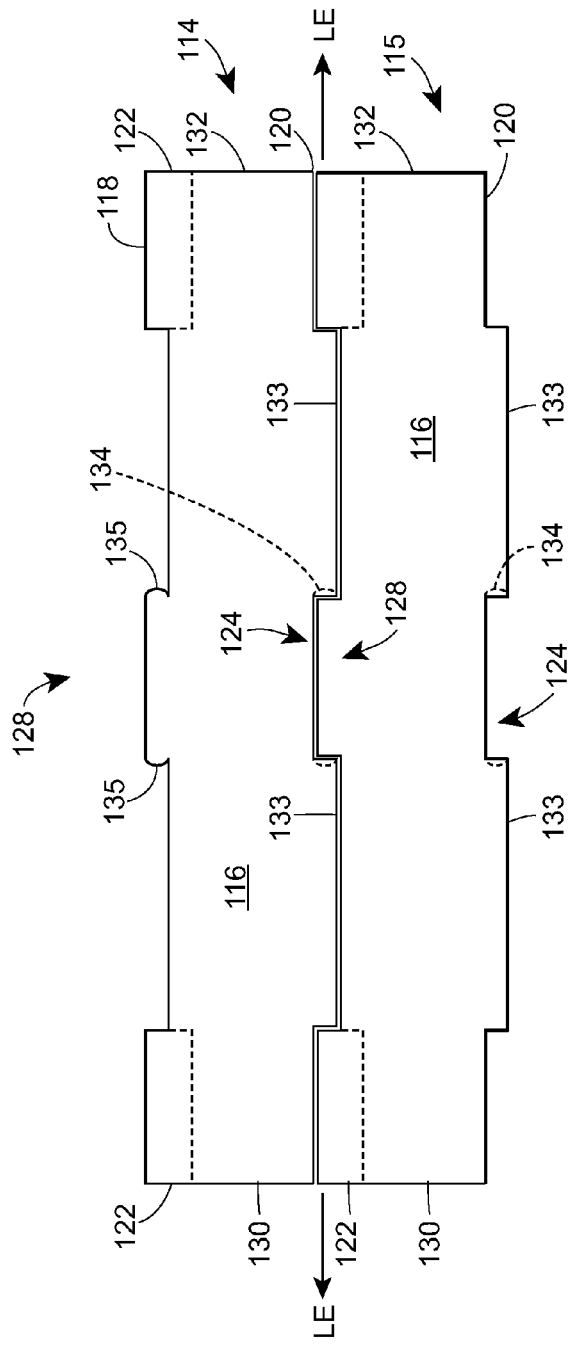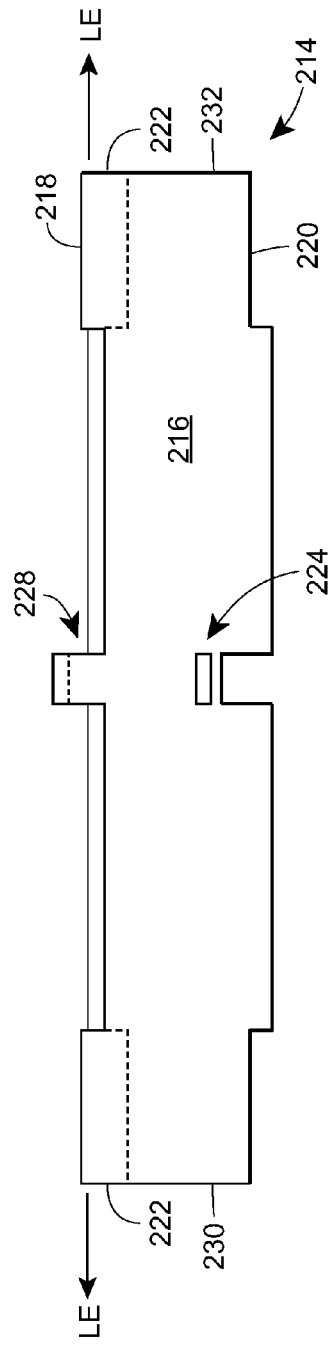

CONVEYOR BELT SLAT

CROSS REFERENCE TO RELATED APPLICATION

This application claims the benefit under 35 U.S.C. § 119(e) of U.S. provisional patent application Ser. No. 62/161,239, filed May 13, 2015, the entire disclosure of which is incorporated herein by reference, is hereby claimed.

FIELD OF THE INVENTION

The present invention is directed to a conveyor belt having a plurality of slats and configured to receive and convey a food product without leaving marks or deforming the food product.

BACKGROUND OF THE INVENTION

A conveyor toaster is a well-known cooking device that uses a heated platen and a slowly rotating conveyor belt. The conveyor belt urges food product (being carried by the conveyor belt) against the platen while it simultaneously pulls the food product across the platen's hot surface. By virtue of its design, a conveyor toaster is able to process food products continuously as opposed to the toasters commonly used by consumers that process food products in batch mode. Conveyor toasters are ill-suited for consumer use because of their size, manufacturing cost, power requirements, and the time required to pre-heat the platen to operating temperature. They are preferred, however, by restaurants and food services that require high-volume through-put and consistent heating/toasting.

Wire conveyor belts used in conveyor toasters and in other fields of technology have been known for many years. Wire conveyor belts are ideal for material handling, cooking, icing, slicing, breading, cooling, filling, inspecting, and packing of products like breads, rolls, buns, donuts, confections, cakes, pies, pastries, meat, seafood, poultry, and other processed foods. The simple, open design of wire conveyor belts provides efficient operation with minimum maintenance and easy cleanup to meet sanitation requirements. A known exemplary wire conveyor belt (such as the belt 810 depicted in FIG. 14) comprises a plurality of spaced metal rods interconnected by coupling "hook" and "loop" connection elements formed at the rod ends of adjacent metal rods. In the conveyor belt, the rods support a food product to be conveyed and hold the components of the belt together by way of the interconnected hook and loop connection elements.

Wire conveyor belts and conveyor toasters, however, create a number of problems in the food industry. It has been found, for example, in some instances that the rods of a wire conveyor belt can undesirably leave a mark on a food product that runs on top of the belt which can damage the food product and/or render it aesthetically unpleasing to the retailer or the consumer at the point of sale. The markings often become prominent if the product is heated while it is on the belt and/or put under pressure, particularly when the product being conveyed is naturally soft or pliable, such as with many food products processed using conveyor toasters. Since product appearance is an important part of any food item, the marking can be a barrier to the use of a conventional wire conveyor belt to carry food products.

To overcome the marking problems, some conveyor belts include metal plates that attach to the metal rods to provide a uniformly flat support surface. One such conveyor belt, for example, is the wire conveyor belt disclosed in U.S. Pat. No. 7,987,972, which is herein incorporated by reference in its entirety. This design provides a flat support surface, but is relatively expensive to produce and can create gaps between the plates that can mark or even deform a food product. Gaps are naturally created in the conveyor belt when the plates rotate about a driving mechanism. These gaps can allow for the food product to be pinched when the plates come together after the belt already has been loaded with a food product.

Accordingly, there exists a need in the marketplace for a conveyor belt system that is capable of heating and placing a food product under a compressive force without substantially marking or pinching the food product.

DETAILED DESCRIPTION

FIG. 2 is a top view of a first slat and a second slat hingedly coupled together according to an embodiment of the disclosure;

FIG. 3 is a side view illustrating the first and second slats of FIG. 2 hingedly coupled about a hinge pin;

FIG. 4 is a top view of a first slat and a second slat hingedly coupled together according to another embodiment of the disclosure;

FIG. 5 is a top view of a slat according to another embodiment of the disclosure;

DETAILED DESCRIPTION

A conveyor belt system, disclosed herein, heats and conveys a food product without substantially marking or pinching the food product. A conveyor belt 10 according to the disclosure and illustrated generally in FIG. 1 provides a continuous support surface for conveying an item, particularly a food item, the continuous support surface being structured and arranged to receive, grip, and retain the item.

Figure 1:
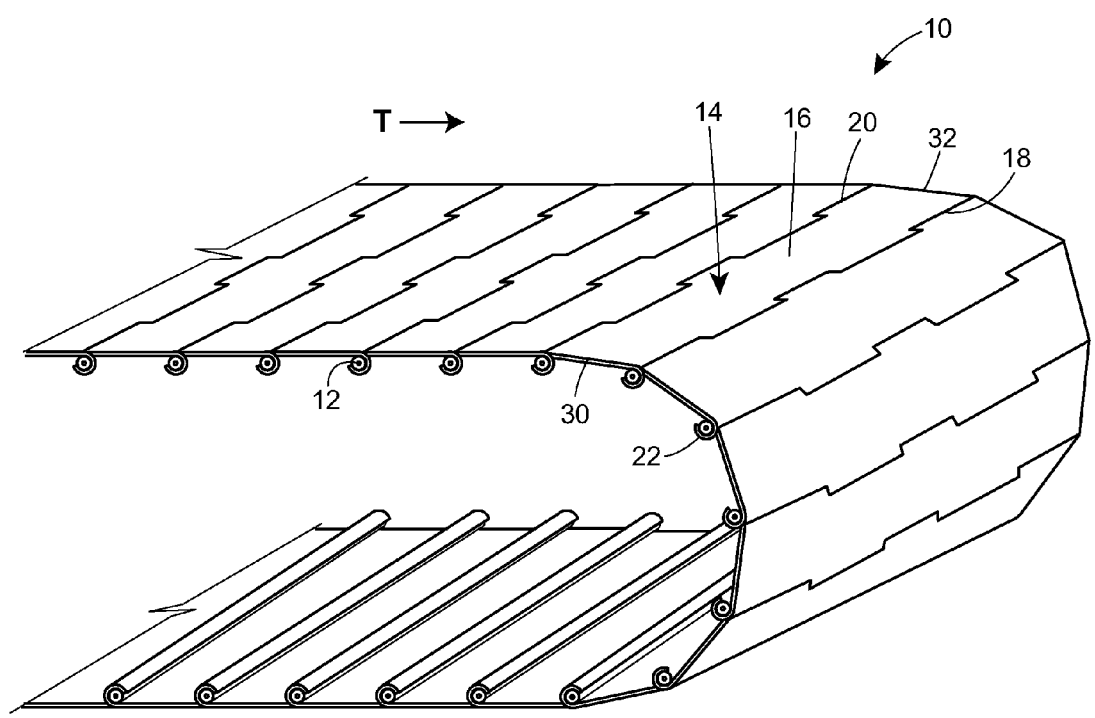
FIG. 1 illustrates a conveyor belt according to an embodiment of the disclosure.

A conveyor belt 10 according to the disclosure is partially and generally illustrated in FIG. 1. The conveyor belt 10 comprises a plurality of spaced metal rods 12 and a plurality of substantially flat metal slats 14. The conveyor belt 10 includes a top side, or support surface for conveying an item. The support surface is formed by the plurality of metal slats 14 which are coupled to the plurality of spaced metal rods 12. Each metal slat 14 includes a base portion 16 having a leading edge 18 and a trailing edge 20 relative to the direction of conveyance travel, for example, the direction of travel T of FIG. 1. The leading edge 18 and trailing edge 20 are perpendicular relative to the direction of conveyance travel T of the conveyor belt 10. Each metal slat 14 couples to the conveyor belt 10 by attaching at least one of the leading edge 18 and the trailing edge 20 to one of the plurality of rods 12. FIG. 1 illustrates the leading edges 18 of the plurality of slats 14 coupled to the plurality of rods 12. In other embodiments, the trailing edges 20 of the plurality of slats 14 may be coupled to the plurality of rods 12 or both the leading and trailing edges 18, 20 of the plurality of slats 14 may be coupled to the plurality of rods 12. In another embodiment (not shown), the trailing edge 20 is free from attachment to other structure, i.e., free of attachment to the plurality of rods 12 whether via direct attachment to the rods 12 or via indirect attachment to the rods 12 (e.g., the trailing edge is free of attachment to a directly adjacent slat 14 that itself is connected to the plurality of rods 12), such that the leading edge 18 provides a hinged joint arranged to provide at least partial rotation of the trailing edge 20 about the leading edge 18 of each slat 14.

Turning to the embodiment shown in FIG. 1, FIG. 2 is a top view of a first slat 14 and a second slat 15 hingedly coupled together. As illustrated, the first slat 14 has a first hook 22 and a second hook 22 formed in a leading edge 18 of the first slat 14. Typically, one or more hooks 22 may be located at the leading edge 18, for example, generally on opposing side edges 30, 32 of the base 16 of the slat 14 (as illustrated) and/or in the middle of the leading edge 18 of the base 16 (not shown). Referring back to FIG. 2, each of the first and second hooks 22 are U-shaped channel members adapted to be hingedly coupled to one of the plurality of metal rods 12. Slat 14 also comprises one or more hinge portions 24a formed along the leading edge 18 of the slat 14 and one or more hinge portions 24b located along the trailing edge 20 of the slat 14. Each hinge portion 24a, 24b comprises a hollow cylinder shaped section adapted to receive a hinge pin 26. As illustrated, the hinge portions 24a and the hooks 22 are both disposed along the leading edge 18 at generally the same locations along an axis LE defined by the leading edge 18, with the hinge portions 24a generally being disposed above the hooks 22 as best shown in FIG. 3 (also shown in the side view shown in FIG. 1, when the slats are moving in the direction of conveyance travel T). More specifically, as best shown in FIG. 3, the hooks 22 are formed at the leading edge 18 and thus further comprise hinge portions 24a which are also formed at the leading edge 18. The hinge portions 24a, 24b are generally smaller in diameter than the U-shaped hooks 22 and are located a certain distance above the hooks 22 so that the hinge portions 24a, 24b do not interfere with the rods 12. The hinge portions 24b disposed along the trailing edge 20 are generally coplanar with the base 16 and the hinge portions 24a disposed along the leading edge 18. The slat 14 further comprises multiple notches 28a, 28b along the leading and trailing edges 18, 20. As illustrated, a middle hinge portion 24a is spaced between the first and second hooks 22, the hinge portion 24a being approximately equidistant from the first and second hooks 22 along the leading edge 18 of the first slat 14. While no hook 22 is shown at the location of the middle hinge portion 24a, a hook 22 can be along the leading edge 18 at generally the same location along axis LE defined by the leading edge 18, such that the hinge portions 24a is generally disposed above the hook 22 as previously described. First and second notches 28a are located between the hooks 22 and the "middle" hinge portion 24a along the leading edge 18. As illustrated, first and second hinge portions 24b are formed along the trailing edge 20 of the first slat 14, separated by a middle notch 28b. The notches 28a are disposed along the leading edge 18 in locations that generally correspond to the locations of the hinge portions 24b formed along the trailing edge 20 of the slat 14 such that the notches 28a can receive the hinge portions 24b when two slats 14 are coupled together. Similarly, the notches 28b are disposed along the trailing edge 20 in locations that generally correspond to the locations of the hinge portions 24a (and hooks 22) formed along the leading edge 18 of the slat 14 such that the notches 28b can receive the hinge portions 24a when two slats 14 are coupled together. When adjacent slats 14 are coupled, the coupled slats 14 can provide a substantially continuous, flat surface.

FIGS. 2 and 3 illustrate the first and second slats 14, 15 hingedly coupled about the hinge pin 26. The first slat 14 is hingedly coupled to the second slat 15 via a hinge pin 26, which is represented by dotted lines in FIG. 2. A middle hinge portion 24a formed along a leading edge 18 of the second slat 15 mates with the middle notch 28b formed along the trailing edge 20 of the first slat 14. When the leading edge 18 of the second slat 15 and the trailing edge 20 of the first slat 14 align, the hinge pin 26 may slide through the through the hinge portions 24a of the leading edge 18 of the second slat 15 and the hinge portions 24b of the trailing edge 20 of the first slat 14. The hinge pin 26 extends a distance greater than the collective width of the first and second hinge portions 24b of the first slat 14 and the middle hinge portion 24a of the second slat 15. Generally, the hinge pin 26 is disposed through a first hinge portion 24a of the second slat 15 (the first hinge portion 24a being disposed above the first hook 22 as previously described), a first hinge portion 24b of the first slat 14, a middle hinge portion 24a of the second slat 15, a second hinge portion 24b of the first slat 14, and a third hinge portion 24a of the second slat 15 (the third hinge portion 24a being disposed above the first hook 22 as previously described), to a second side edge 32 of the base 16, i.e., the hinge pin 26 extends from a first side edge 30 to a second side edge 32 of the base 16. Once the hinge pin 26 is in place, the first and second slats 14, 15 are hingedly coupled.

The hinge pin 26 mates the first and second slats 14, 15 so that the slats 14, 15 form a continuous conveyor belt surface. Referring back to FIG. 1, the partial conveyor belt 10 comprises a plurality of the slats 14 depicted in FIG. 2. A side view of the first and second slats 14, 15 of FIG. 2 is illustrated in FIG. 3. FIG. 2 best shows the first and second hooks 22 of each slat 14. The hooks 22 of the first slat 14 are coupled to one of the plurality of rods 12 of the conveyor belt 10. The hinge pin 26 connecting the first and second slats 14, 15 is located just above the rod 12, allowing the first and second slats 14, 15 to mate and indeed even overlap such that a substantially flat surface for conveying an item is formed. This overlapping feature of the slat 14 advantageously reduces the formation of gaps in the conveyor belt 10 that can result in undesirable marking on the products to be conveyed.

In another embodiment shown in FIG. 4, a first slat 114 and a second slat 115 are hingedly connected. FIG. 4 illustrates a top view of the first and second slats 114, 115, the slats 114, 115 comprising a base portion 116 for carrying an item, the base portion 116 having a perpendicular leading edge 118 and a perpendicular trailing edge 120 of the base (relative to the direction of conveyance travel of the conveyor belt), wherein at least one of the leading edge 118 and the trailing edge 120 is coupled to a metal rod of a plurality of metal rods (not shown in FIG. 4, but generally described above and shown with reference to FIGS. 1-3, 14-15). At least one of the leading edge 118 and the trailing edge 120 of the base portion 116 of the slat 114 comprises a tab 128 comprising two posts 130 and the other of the leading edge 118 and the trailing edge 120 comprises a notch 124 for receiving the tab 128. Generally, the tab 128 and the notch 124 are centrally disposed along the leading edge 118 and the trailing edge 120 (relative to a direction of conveyance travel, not shown), respectively, but of course, as mentioned above, the relative positions can be changed such that the notch 124 is disposed along the leading edge 118 and the tab 128 is disposed along the trailing edge.

As illustrated, the trailing edge 120 comprises two tab portions 133 comprising a receptacle 134, with the notch 124 being provided between the two tab portions 133 comprising a receptacle 134. Two adjacent slats 114 and 115 are hingedly coupled by mating the posts 135 of tab 128 of slat 115 with the receptacles 134 of tabs 133 of slat 114, thereby coupling the trailing edge 120 of slat 114 to the leading edge 118 of adjacent slat 115.

In the illustrated embodiment, the slats 114, 115 also include first and second hooks 122 along the leading edge 118. Each of the first and second hooks 122 are U-shaped channel members adapted to be hingedly coupled to one of the plurality of metal rods (not shown in FIG. 4, but generally described above and shown with reference to FIGS. 1-3, 14-15).

Posts 135 protruding from the tab 128 in the direction of an axis LE defined by the leading edge 118 snap into corresponding receptacles 134 provided in tab portions 133 of an adjacent slat 114 as previously described. The tab 128 provides a snap-in or push-fit feature that allows the posts 135 to be snapped/pushed into the receptacles 134 so that the first and second slats 114, 115 may snap and lock together. Similar to the hinge pin of the first embodiment, the snap feature allows a first and a second slat 114, 115 to hingedly couple to form a substantially continuous conveyor belt surface suitable for conveying an item.

Optionally, additional posts (not shown) can be provided on an interior of the hooks 122, the posts extending from the hooks and being disposed along the same axis LE (defined by the leading edge 118) as posts 135. Similarly, further corresponding receptacles (not shown) capable of receiving the additional posts can be provided in the tabs 133.

FIG. 5 illustrates a top view of another exemplary slat 214 in accordance with the present disclosure, the slat comprising a base portion 216 for carrying an item, the base portion having a perpendicular leading edge 218 and a perpendicular trailing edge 220 relative to the direction of conveyance travel of the conveyor belt. In the illustrated embodiment, the slat 214 also include first and second hooks 222 along the leading edge 218. Each of the first and second hooks 122 are U-shaped channel members adapted to be rotatably coupled to one of the plurality of metal rods (not shown in FIG. 5, but generally described and shown above with reference to FIGS. 1-3). A clip 228 extends from the leading edge 218 and beyond the hooks 222 of the slat 214. The clip 228 can be coupled to a slot or opening 224 in an adjacent slat. The slot or opening 224 is formed in the trailing edge 220 of the slat 114. This embodiment is merely illustrative and many different coupling elements 224, 228, including a variety of male and female components, may be provided in adjacent slats in order to couple the same.

Figure 6:
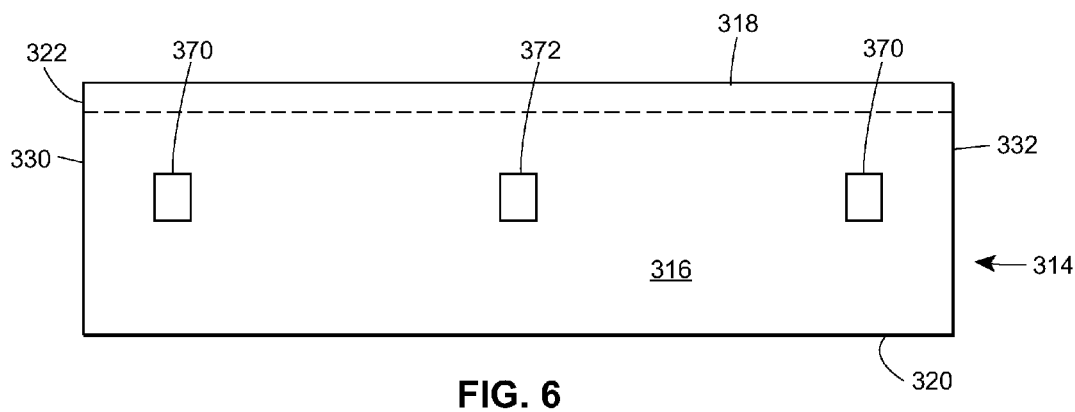
FIG. 6 illustrates a slat according to another embodiment of the disclosure further including an additional feature allowing a driving mechanism of a conveyor belt assembly to grip and move the slat.

Turning now to FIG. 6, a slat 14, 114, 214 of any of the embodiments described herein may include an additional feature formed in the base 16, 116, 216 that allows a driving mechanism of a conveyor belt assembly to grip and move the slat 14, 114, 214 in translational and rotational motion. For example, the slat 314 in FIG. 6 may include first and second openings or slots 370 located in opposing side edges 330, 332 of the base 316 of the slat 314, the openings 370 providing surfaces that can be engaged by a tooth (not shown) of the driving mechanism (not shown). Alternatively, or in combination with the first and second openings 370, a middle opening or slot 372 can be centrally formed in the base 116 of the slat 114 to provide a surface that can be engaged by the driving mechanism. The location of the openings 370, 372 may vary according to where the driving mechanism is placed relative to the slats and how the driving mechanism will engage the slats. The driving mechanism (illustrated in FIG. 13) may have a plurality of teeth that fit in one or both of the openings 370, 372 of the slat 314. Once a tooth of the driving mechanism engages the opening 370, 372 of the slat 314, the driving mechanism can move the slat 314 along the conveyor belt loop. In other embodiments, the slats may be engaged by a driving mechanism by providing a nob or a ledge formed on a bottom surface of the slat that can engage a furrow defined between teeth of the driving mechanism.

Figure 7:
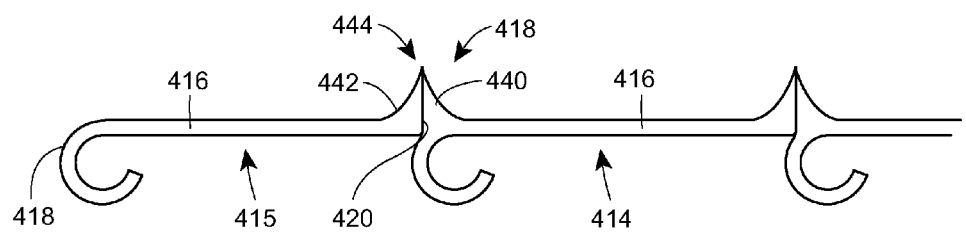
FIG. 7 is a side view illustrating a slat according to another embodiment of the disclosure that has a divider structure to separate items to be conveyed.
Figure 8:
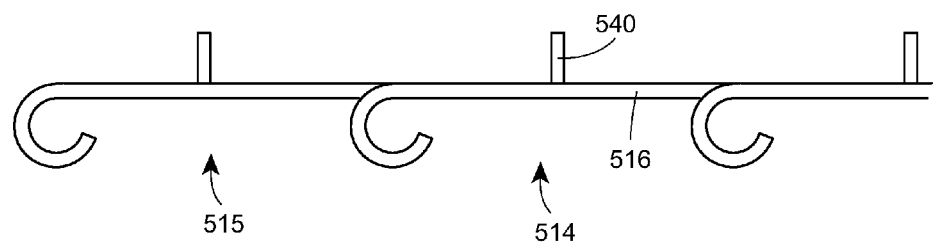
FIG. 8 is a side view illustrating a slat according to another embodiment of the disclosure that has an alternative divider structure.
Figure 9:
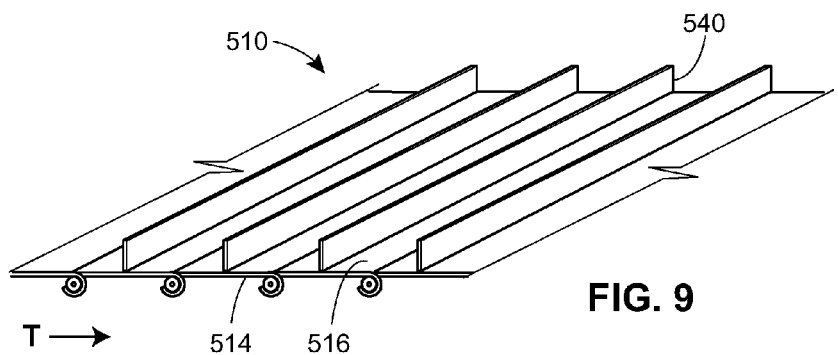
FIG. 9 illustrates a plurality of slats of FIG. 8 coupled to one another.
Figure 10:
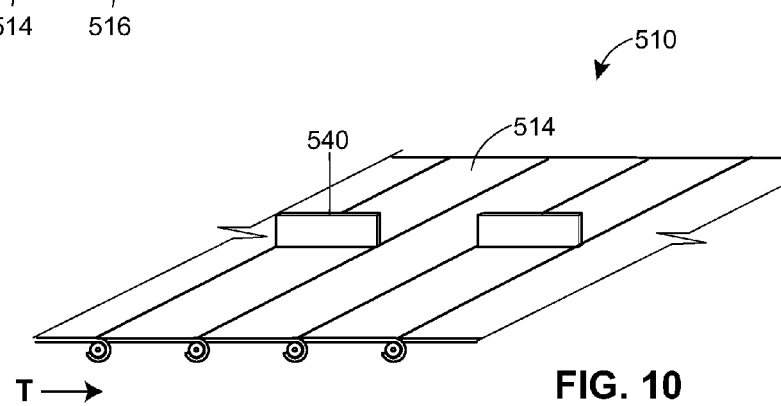
FIG. 10 is a side view illustrating a slat according to another embodiment of the disclosure that has yet another alternative divider structure.
Figure 11:
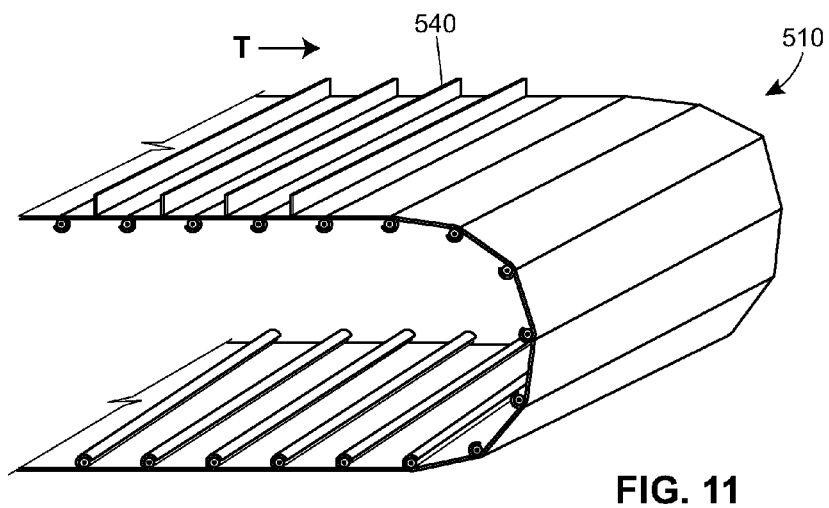
FIG. 11 is a partial, perspective view of a conveyor belt with a plurality of divider structures protruding from the base portion of the plurality of slats.

Turning to FIGS. 7-11, a conveyor belt 510 using any of the embodiments described herein can employ a divider 540 to separate or divide the items to be conveyed, such as food products, on the conveyor belt 510. In the first example, a first and a second slat 414, 415 illustrated in FIG. 7 are hingedly coupled in any of the ways described herein. The first slat 414 has a ramp feature 440 extending vertically from a base portion 416 of the slat 414 where a highest point of the ramp feature 440 terminates at a leading edge 418 of the first slat 414. The second slat 415 has a ramp feature 442 extending vertically from a base portion 416 where a highest point of the ramp feature 442 terminates at a trailing edge 420 of the second slat 415. The first and second slats 414, 415 mate, and thus the ramp feature 440 of the first slat 414 and the ramp feature 442 of the second slat 415 form a peak 444. Another dividing structure 540 is illustrated in the conveyor belt 510 of FIGS. 8, 9 and 11. Turning first to FIG. 8, a first slat 514 has a barrier wall 540 at a predetermined location extending vertically from a base portion 516 of the slat 514 to divide the base portion 516 of the slat 514 into first and second compartments. FIG. 9 illustrates a perspective view of the plurality of slats 514 coupled to adjacent slats 514. The dividers 540 are perpendicular relative to the conveyance travel T of the conveyor belt 510. In this illustrated example, every slat 514 has a barrier wall 540 projecting from the base portion 516 of the slat 514. However, this is merely illustrative, and the barrier walls 540 may project from every other slat or every two slats 514, and so on. FIG. 10 illustrates a different embodiment than FIGS. 8, 9, and 11. The divider 540 in FIG. 10 extends from the base portion 516 of the slat 514 in a direction substantially parallel to the direction of conveyance travel T of the conveyor belt 510. The barrier wall 540 may also be disposed along the leading and trailing edges of a slat base 516. FIG. 11 illustrates a partial and perspective view of the conveyor belt 510 with a plurality of dividers 540 protruding from the base portion 516 of the plurality of slats 514. The dividing structure 540 may serve to index food product to be conveyed by the toaster. For example, the dividing features may prevent overloading the conveyor belt, or it may be used to index the amount of food product conveyed. The dividers may also prevent the food product from moving or getting moved by other food products on the same conveyor belt.

The conveyor belt slats described herein can be manufactured from any suitable material, but is preferably formed from an extrudable material including, but not limited to, extrudable metals, extrudable polymers, and extrudable ceramics. Exemplary extrudable metals include, but are not limited to, aluminum, brass, copper, magnesium, and steel. Aluminum alloys such as hard coated anodized aluminum, for example AA 6063-T6, are preferred. Exemplary extrudable plastics include, but are not limited to, polyvinylchlorides, polyethylenes, polypropylenes, acetals, acrylics, nylons (polyamides), polystyrene, acrylonitrile butadiene styrenes, and polycarbonates. Additionally, the slats may be manufactured using a hybrid of materials including metals and rubbers.

The conveyor belt described and illustrated herein provides a surface of the slats that is generally smooth. The top surface may, however, be corrugated or textured to better grip an item over a distance of the conveyor belt loop. For example, the top surface of an alternative conveyor belt slat may include gripping features to retain an item while the item is transported to facilitate the frictional engagement of the food product. The gripping features allow the top surface to grip on to any kind of surface the item may have, for example, a round or very smooth item that can easily move or slide while being transported. The roughness of the surface of the slats in one embodiment may be provided by shot peening the surfaces of the slats using a predetermined shot size, as is disclosed in U.S. Application Publication No. US 2010/0275789 A1, which is herein incorporated by reference in its entirety. Alternatively, the surface of the slat may have gripping features such as an abrasive coating, dimples, furrows, or protrusions that would be strong enough to grip the food product, but not so abrasive that the gripping features rip, tear, or mark the food product. Other features that improved surface traction include, but are not limited to, perforations, bosses or dimples, etching, sanding/grinding, or other gripping features that are formed or molded. The gripping features may be integrally formed on the top surface of the conveyor belt slat and take the shape of a series of parallel rows of sharp ridges and furrows. Of course, similar features can be added post-manufacturing and/or take other geometrical shapes to enhance friction between the top surface and the item to be conveyed. Alternatively, instead of a series of rows of ridges, the gripping features may be provided by a grid of textured pegs. A variety of other geometric shapes can also be used provided that the gripping features enhance friction between the top surface and the item to be conveyed.

Figure 12:
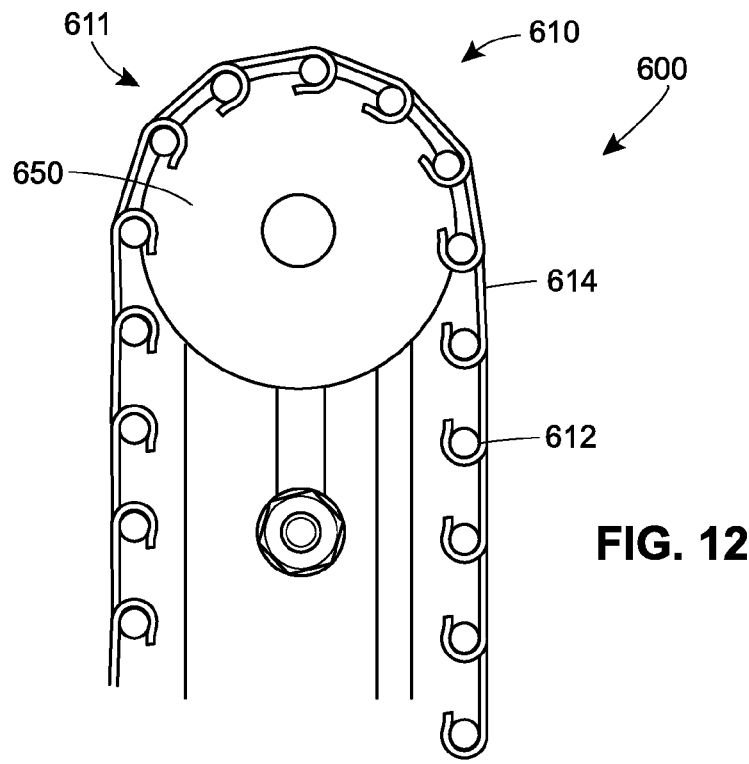
FIG. 12 illustrates a drive assembly driving a conveyor belt according to the disclosure around an end loop of a conveyor belt assembly.
Figure 13:
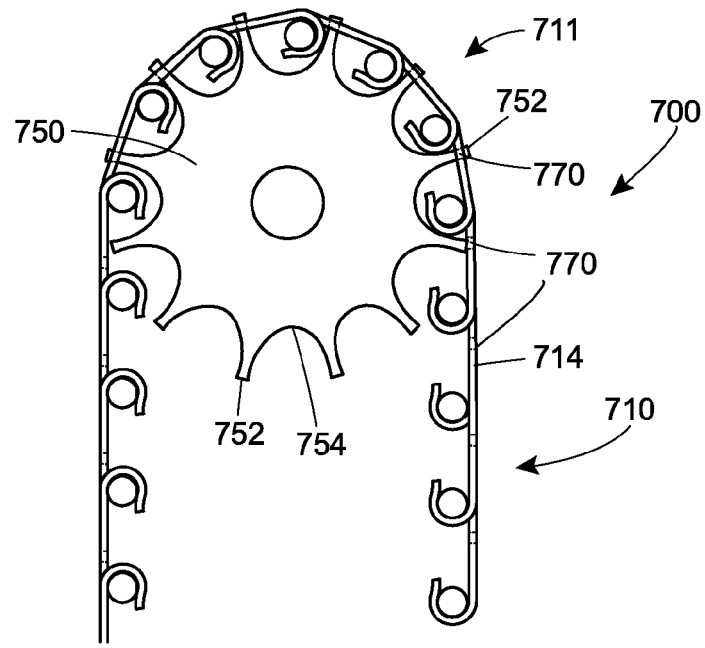
FIG. 13 illustrates an alternative drive assembly driving an exemplary conveyor belt according to the disclosure around an end loop of a conveyor belt assembly.

Referring now to FIGS. 12-13, a partial conveyor belt assembly 600 including a conveyor belt 610 comprising a plurality of slats 614 (any of which described herein) and a driving mechanism 650 that drives the conveyor belt 610 of the slats 614. In FIG. 12, a rounded drive 650 grips the rods 612 of the belt 610 and drives the belt 610 around an end loop 611 of the conveyor belt assembly 600. In FIG. 13, a sprocket 750 having a plurality of teeth 752 and a plurality of furrows 754 between the teeth 752 drive the conveyor belt 710 about the end loop 711 by engaging the slats 714. To drive the conveyor belt 710, the teeth 752 of the sprocket 750 engage at least one opening 770 in the base portion 716 of the conveyor belt slats 714 (see FIG. 6). In another embodiment, a protruded tab or clip structure engages the furrows 754 of the sprocket 750.

In one embodiment, devices comprising the conveyor belt assembly according to the disclosure advantageously transport one or more food products in a direction, e.g. horizontally or vertically downward along a heated platen so as to expose the food products to the energy radiating from the platen. Any of the embodiments disclosed herein may be part of a conveyor belt assembly that can be used in many food heating devices, such as toasters, that require one or more conveyor belt assemblies. For example, the conveyor belt assembly can be implemented in a vertically oriented food heating device. A vertical food heating device employs two conveyor belt assemblies as is shown for example in U.S. Pub. No. 2010/0275789, which is incorporated herein by reference in its entirety. A horizontal food heating device is disclosed in U.S. Pat. No. 7,800,023, which is incorporated herein by reference in its entirety.

Alternatively, the conveyor belt assembly comprising one of the many embodiments of the conveyor belt slat may incorporate heat in one or more different ways. The conventional way of heating a food product in a conveyor toaster would be through heated platens, as mentioned above. The conveyor belt assembly described herein may incorporate heating mechanisms to cook or otherwise heat the food being conveyed by implementing a heated slat. In the case of a heated slat, the food being conveyed by the conveyor belt would be treated with heat emanating from the slat itself. The heated slat may emit heat by absorbing heat from exposure from a heat lamp, or the slat may be connected to a power source and use resistive heating to provide heat directly. Additionally, the conveyor belt assembly may incorporate heat through induction, for example, by winding an electromagnet such as iron wire around the top surface of the conveyor belt assembly and passing a high-frequency alternating current (AC) through the electromagnet.

Figure 14:
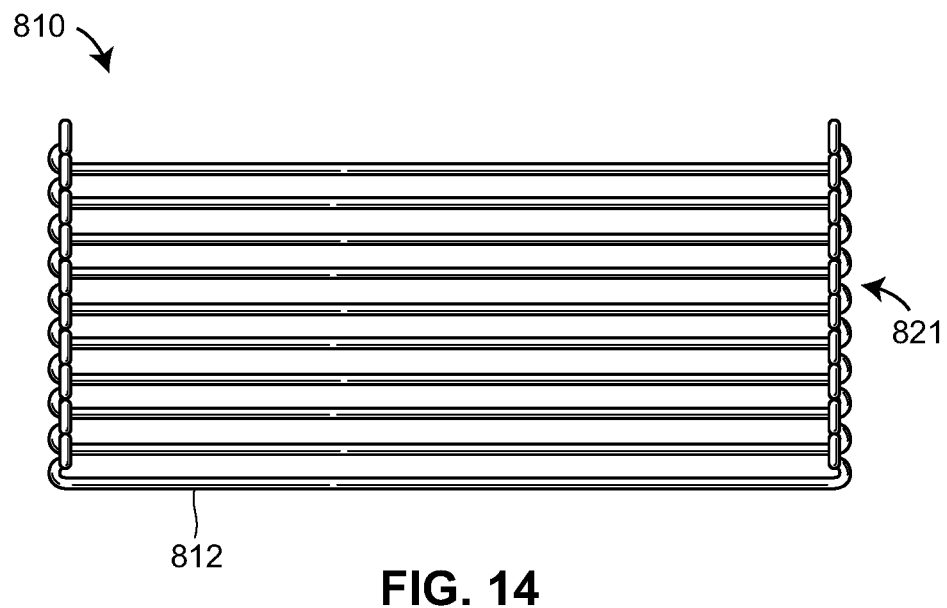
FIGS. 14 and 15 illustrate a suitable scaffolding for receiving a plurality of slats according to the disclosure.
Figure 15:
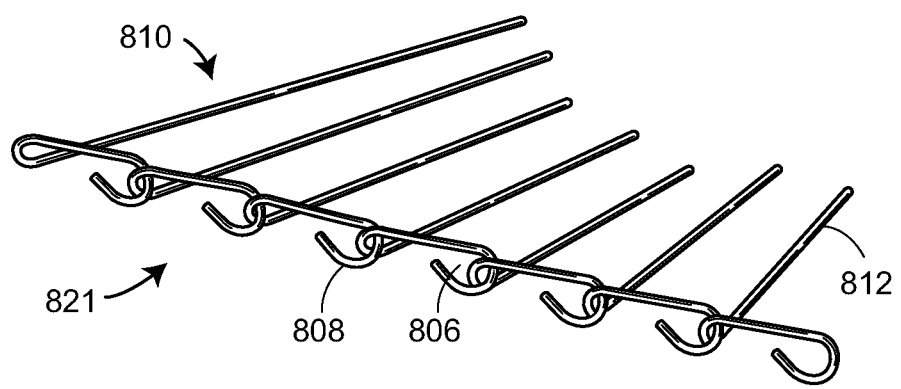

Referring to FIG. 14, the conveyor belt 810 comprises a plurality of spaced metal rods 812 disposed in succession and transversely with respect to a direction of conveyance travel T as represented by arrow T of the belt 810. In the illustrated embodiment, the plurality of spaced rods 812 are provided by a conventional wire conveyor belt (such as the belt 810 depicted in FIG. 14) which essentially serves as a scaffolding for a plurality of metal slats 14 discussed in more detail below. Other scaffoldings capable of receiving metal slats 814 may also be used. Each rod 812 has two end portions 821 and a supporting rod portion extending there between. Each end portion 821 comprises a terminal hook connection element 808 that protrudes in a first direction, curves, and extends in a direction substantially opposite to the first direction for a predetermined distance. Each rod 812 also has two loop connection elements 806, which are formed in the rods themselves. As best shown in FIG. 15, the hook connection elements 808 are interconnected/coupled to loop connection elements 806 of an adjacent spaced metal rod 812 so as to interlock the adjacent spaced metal rods 812. The rods 812 are preferably formed from a suitable metal such as copper, iron, aluminum, and nickel, and/or using a suitable alloy such as steel, brass, and bronze. Stainless steel is a preferred material for manufacturing the metal rods 116 and AISI T-304 is an exemplary type of stainless steel that may be used.

What is claimed is:

1. A conveyor belt, the conveyor belt comprising:
   a plurality of spaced rods movable by a conveyor belt drive mechanism, and
   a plurality of slats, a first slat of the plurality of slats comprising a base portion for carrying an item, the base portion having a perpendicular leading edge oriented relative to a direction of conveyance travel of the conveyor belt and a perpendicular trailing edge oriented relative to the direction of conveyance travel,
   wherein the leading edge of the first slat is coupled to one of the plurality of rods at a first location and the trailing edge is coupled to a second slat at a second location, the second location being offset from the plurality of rods.

2. The conveyor belt of claim 1, wherein the trailing edge of each of the plurality of slats hingedly couples to the leading edge of an adjacent slat.

3. The conveyor belt of claim 1, wherein the base portion comprises connection means for engaging the conveyor belt drive mechanism.

4. The conveyor belt of claim 1, wherein one of the leading edge and the trailing edge comprises one or more tab portions comprising one or more posts and the other of the leading edge and the trailing edge comprises a one or more tab portions comprising one or more receptacles for receiving the post.

5. The conveyor belt of claim 4, wherein two tab portions comprising a receptacle are provided along one of the leading edge and the trailing edge, a notch being provided between the two tab portions comprising a receptacle, one tab portion comprising two posts is provided along the other of the leading edge and the trailing edge, the tab portion comprising two posts being disposed in the notch such that the posts are received by the receptacles, thereby hingedly coupling the trailing edges of each of the plurality of slats to the leading edges of an adjacent slat.

6. The conveyor belt of claim 4, wherein two tab portions comprising a post are provided along one of the leading edge and the trailing edge, a notch being provided between the two tab portions comprising a post, one tab portion comprising two receptacles is provided along the other of the leading edge and the trailing edge, the tab portion comprising two receptacles being disposed in the notch such that the posts are received by the receptacles, thereby hingedly coupling the trailing edges of each of the plurality of slats to the leading edges of an adjacent slat.

* * * * *